Jan. 9, 1968   R. C. WEISS   3,362,680
VALVE SEAT
Filed Oct. 18, 1962   2 Sheets-Sheet 1
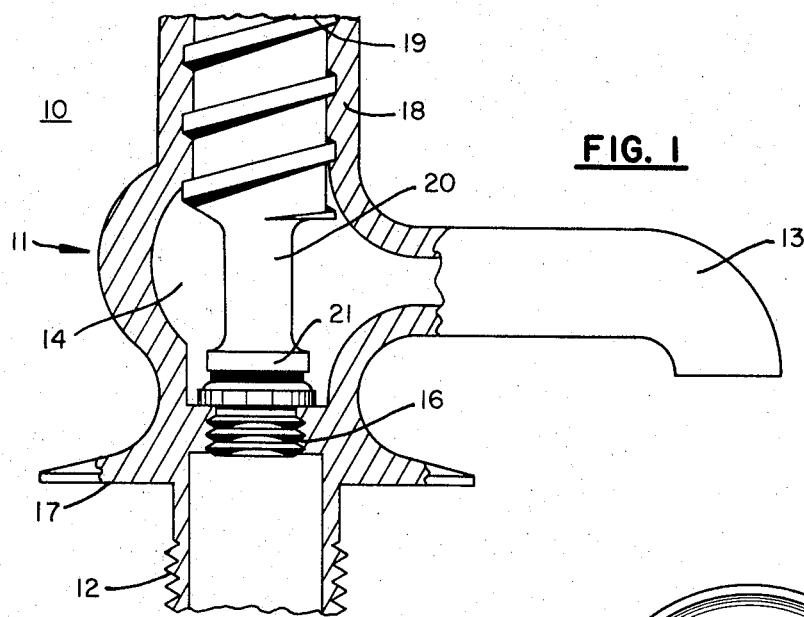
FIG. 1
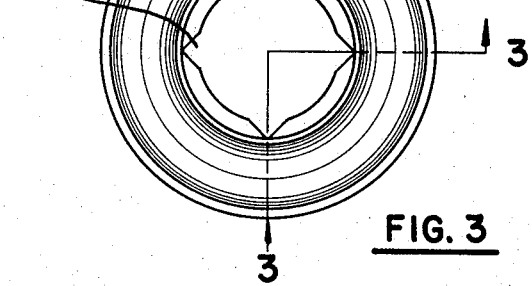
FIG. 2
FIG. 3
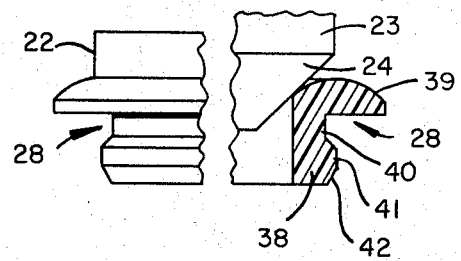
FIG. 4   FIG. 5
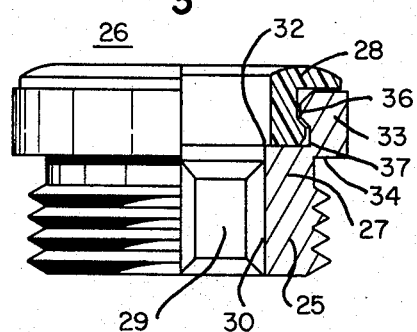
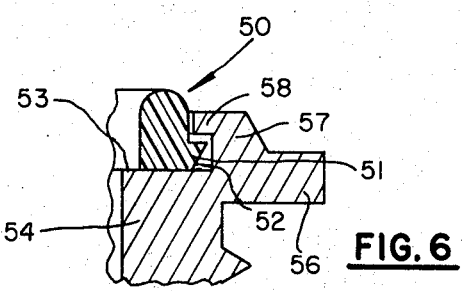
FIG. 6
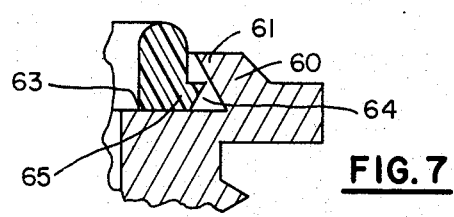
FIG. 7
INVENTOR.
ROBERT C. WEISS
BY
William R. Liberman United States Patent Office 3,362,680
Patented Jan. 9, 1968

3,362,680
VALVE SEAT
Robert C. Weiss, 4590 Park Ave.,
New York, N.Y. 10458
Filed Oct. 18, 1962, Ser. No. 231,512
19 Claims. (Cl. 251—360)

The present invention relates generally to improvements in valves and it relates more particularly to improvements in valve seats and valve seat assemblies.

In the conventional water valve, as typified by faucets and the like, the closing and opening of the valve is generally effected by bringing a valve washer into tight engagement with a valve seat and by separating the valve washer from the valve seat respectively. The valve seat is generally of metal and is formed as part of or is rigidly affixed to the valve body, and the valve washer is usually formed of a compressible material and is affixed to the end of a threaded valve stem. The turning of the valve stem advances or retracts it relative to the valve seat to rotate and to advance or retract the valve washer.

Valves of the above conventional construction pose numerous drawbacks and disadvantages. Important among these drawbacks is the rapid wear of both the washer and valve seat resulting in leaky valves and requiring the frequent replacement of the valve washer and the recutting and resurfacing or replacement of the valve seat or the entire valve body. With these valves, when the washer makes contact with the valve seat, there is a tendency to bind at the point of contact resulting in the valve leaking if the washer is at all inclined to the valve seat or if the valve stem is out of line, which is not uncommon. In order to close the valve completely under the above conditions, it is necessary to apply a large force to the valve handle, a procedure which is not only difficult and annoying but aggravates the malfunctioning of the valve and eventually impairs the valve mechanism. There have been many proposed constructions for overcoming the above drawbacks but these have left much to be desired and have not been widely commercially adopted.

It is, therefore, a principal object of the present invention to provide an improved valve.

Another object of the present invention is to provide an improved valve seat and valve seat assembly.

Still another object of the present invention is to provide a valve with an improved valve seat assembly in which the deterioration and wear of the valve seat and valve washer is greatly minimized.

A further object of the present invention is to provide an improved valve requiring a minimum of effort to effect the opening and closing thereof.

Still a further object of the present invention is to provide a valve construction of the above nature characterized by its simplicity, ruggedness and low cost.

The above and other objects of the present invention will become apparent from a reading of the following description, taken in conjunction with the accompanying drawing, wherein:

FIGURE 1 is a fragmentary longitudinal sectional view of a faucet including an embodiment of the present invention;

FIGURE 2 is an enlarged top plan view of the improved valve seat assembly employed therein;

FIGURE 3 is a sectional view taken along line 3—3 in FIGURE 2;

FIGURE 4 is an enlarged fragmentary elevational view of the valve washer and seat in closed position;

FIGURE 5 is a fragmentary longitudinal sectional view of the valve seat and another form of valve washer;

FIGURE 6 is a fragmentary sectional view of another form of valve seat assembly embodying the present invention;

FIGURE 7 is a fragmentary sectional view of still another form of valve seat assembly;

Figure 9:
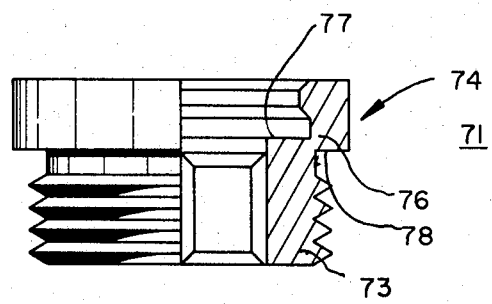
FIGURE 9 is a fragmentary front sectional view of the coupling member.

The present invention is directed primarily to the valve seat structure and in a sense contemplates the provision of a valve seat assembly comprising a tubular collar having a shoulder at one end thereof bordered by an axially directed peripheral flange, and an annular valve seat axial with and rotatably coupled to said collar and having a face abutting the collar end shoulder, the collar and valve seat having a mating peripheral groove and lip to retain them in mutually rotatable assembled condition.

In the preferred form of the present valve seat assembly, the collar is externally threaded and engages a corresponding tapped bore formed in a conventional valve body member and affording communication with a source of liquid. Associated with the valve is a screw-type valve stem carrying a valve washer which is movable into and out of engagement with the valve seat. The valve seat has one end located above the collar of curved convex cross section and its other end is bevelled along its outer peripheral edge to define a camming surface which facilitates the assembly of the collar and valve seat. The valve seat, per se, is of the self-lubricating type and is advantageously formed of a synthetic organic plastic, preferably an acetal resin, as Delrin, or a fluorinated polyolefin such as Teflon, a polytetrafluoroethylene.

Referring now to the drawing, and more particularly to FIGURES 1 to 4 thereof, reference numeral 10 generally designates a faucet provided with the improved seat structure according to the present invention. Faucet 10 comprises a valve body member 11 which may be formed of brass or other suitable metal in the conventional manner and includes a depending externally threaded coupling pipe 12 and a spout 13 leading from a chamber 14 which communicates with pipe 12 by way of a tapped axial bore 16. Surrounding the upper part of pipe 12 is a peripheral flange 17 having a flat annular bottom face which facilitates the mounting of the faucet on a basin or the like and the connection of pipe 12 to the water line.

Projecting upwardly from chamber 14 and coaxial with bore 16 is an internally threaded tubular section 18 which is engaged by a corresponding screw thread 19 formed in the shank of a valve stem or spindle 20. Valve stem 20 and its association with body member 11 is of conventional construction, the valve stem 20 being provided at its upper end with a handle and being assembled with the body member 11 in a water tight manner according to the usual practice which permits the rotation of the valve stem 20 and corresponding axial movement to open and closed positions relative to the associated valve seat. Valve stem 20 terminates at its lower end in a washer seat 21 of well known construction which includes a flat face base and a depending peripheral flange, stem 20 having a tapped axial bore formed therein and extending from the washer seat base. A valve washer 22 formed of natural or synthetic rubber, plastic, leather, or other suitable material registers with washer seat 21 and is secured thereto by an axial screw or other suitable fastening means. As illustrated in FIGURE 4 of the drawing, washer 22 has a flat working or underface. In the alternative, washers of other configurations may be suitably employed such as washer 23 illustrated in FIGURE 5 of the drawing, such washer 23 being of the type which has a downwardly directed working or sealing face 42 of conical configuration. Washer 23 is affixed to seat 21 in the same manner as is washer 22.

Valve seat assembly 26 according to the present invention, as in FIGURE 3, includes a coupling collar 27 and a valve seat 28. The collar 27 may be formed of brass or other suitable material such as a synthetic organic plastic, as Delrin or Teflon, and is provided with a lower externally threaded tubular section 25 which tightly engages the tubular bore 16. Extending through the collar 27 is an axial bore 29 having longitudinally extending grooves 30 formed in the face thereof for the reception of a tool to permit the application, replacement or removal of the valve seat from the tapped bore. The upper end of collar 26 has a flat annular shoulder 32 formed thereon and surrounding shoulder 32 is an upwardly directed peripheral flange 33 having a downwardly directed peripheral shoulder 34 extending laterally beyond the edge of the threaded lower section 25. When associated with a valve body member as 11, shoulder 34 abuts a confronting shoulder surrounding the upper end of the tapped bore 16. Formed on the inner face of the flange 33, shortly below the upper edge thereof, is an inwardly directed peripheral lip 36 which delineates, with the opposing face of shoulder 32, a peripheral groove 37.

Valve seat 28 is of annular configuration and is formed of a self-lubricating type of material advantageously a synthetic organic plastic such as acetal resin or a fluorinated polyolefin, for example, polytetrafluoroethylene. Valve seat 8 rests on shoulder 32 and has a planar underface abutting shoulder 32. The top face of valve seat 28 is rounded and convex as at 39. The outer peripheral face of seat 28 has an annular groove 40 formed therein which registers with the peripheral lip 36 of the valve seat, the peripheral ridge 41 between groove 40 and end face 38 registering with collar groove 37. The outer lower edge of valve seat 28 is bevelled to form an annular cam surface 42 which facilitates the assembly of the valve seat 28 and the collar 27. It should be noted that the dimensions and configurations of valve seat 28 and collar 27 are such that the valve seat 28 fits snugly into and is retained by the mating portion of the collar 27 and is freely and easily rotatable therein.

When employing the valve described above provided with the improved valve seat, many advantages are realized. By turning valve stem 19, washer 22 or 23 is advanced into engagement with the upper surface 39 of the valve seat to close the valve. The valve may be tightly closed with a minimum of effort by reason of the free rotation of valve seat 28 in collar 27. In addition, by reason of the rotation of valve seat 28, there is no relative rotation between the engaged surfaces of the washer and valve seat and hence there is a minimum of abrasive wear. Further, a valve of the present construction may be built to much wider tolerances without adversely affecting the proper and easy operation of the valve. In the event the valve seat is to be replaced, the entire seat assembly 26 is merely unscrewed from the bore 16 by means of a rotatable hand tool provided with projections which engage grooves 30 and are removed. A new valve seat assembly may then be applied and tightened in bore 16.

In FIGURE 6 of the drawing, there is illustrated another form of valve seat assembly in accordance with the present invention, differing from that described above primarily in the coupling arrangement between the valve seat and the collar. Specifically, valve seat 50 is provided along its bottom edge with an outwardly directed peripheral flange 51 having a cam surface defining downwardly inwardly directed peripheral wall 52. The bottom of valve seat 50 is flat and rests on flat shoulder 53 of collar 54. An outwardly directed peripheral flange 56 is disposed along the top of collar 54 and is provided with an upright coaxial annular wall 57 terminating at its top in an inwardly directed lip 58 which delineates with the shoulder 53 and annular groove. Valve seat 50 is freely rotatably retained by the collar 54, flange 51 thereon registering with the collar annular groove. In all other respects, the valve seat assembly and its use is similar to that earlier described.

The embodiment of the present invention illustrated in FIGURE 7 of the drawing is similar to that last described except in the configuration of the annular valve seat retainer wall 60. Wall 60 is of annular configuration and is upwardly and inwardly inclined. The upper section of wall 60 defines a retaining lip 61 which delineates with the collar shoulder 63 an annular retaining groove 64 engaging bottom peripheral flange 65 of the seat.

Figure 8:
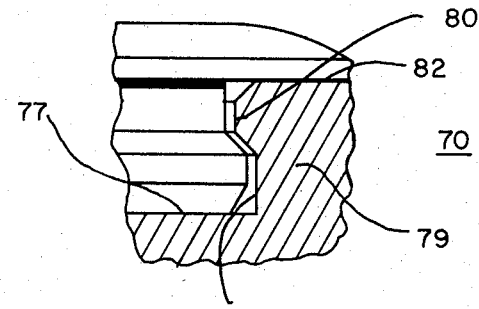
FIGURE 8 is a fragmentary front sectional view of still another form of valve seat assembly embodying the present invention.
Figure 10:
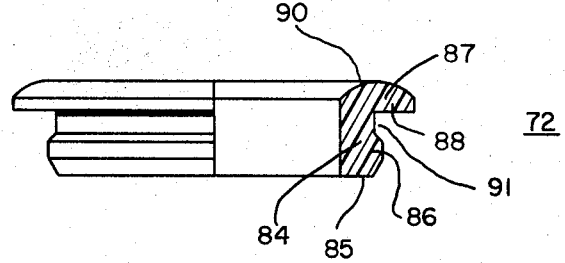
FIGURE 10 is a fragmentary front sectional view of the valve seat.

Referring now to FIGURES 8 to 10 of the drawings which illustrate another embodiment of the present invention and which affords advantages over those embodiments previously described, reference numeral 70 generally designates the valve seat assembly which comprises a coupling collar member 71 and a valve seat 72. Coupling collar 71 includes a lower externally threaded section 73 having internal tool receiving grooves and an upper seat engaging section 74. Upper section 74 is joined to lower section 73 by an intermediate wall 76 having upwardly and downwardly facing flat annular shoulders 77 and 78 respectively. Projecting upwardly from the outer edge of upper shoulder 77 is a peripheral wall 79 provided along its upper border with an inwardly directed peripheral lip 80 of trapezoidal cross-section to delineate, with shoulder 77, a cylindrical groove 81. The top of wall 79 is defined by a flat annular surface 82.

Valve seat 72 is formed of a material similar to that of the previously described valve seats and is in the form of a ring having an outer peripheral surface complementing the inner surface of the collar upper section 74. Specifically, valve seat 72 includes a tubular section 84 having along its outer lower border an outwardly directed peripheral ridge 86 rotatably registering with the peripheral 81 between collar shoulder 77 and lip 80. Tubular section 84 has a flat underface 85 which rests on and registers with collar shoulder 77. Directed radially outwardly from the upper part of the tubular section 84 is a peripheral flange 87 provided at its underface with a flat annular shoulder 88 which rests on the shoulder 82, and an outer cylindrical peripheral face which slidably registers with the confronting face of the upstanding lip. The top seat-defining face 90 of valve seat 72 is of upwardly convex arcuate configuration. An annular groove 91 is delineated by the underface of shoulder 88 and the confronting face of the ridge 86, and is rotatably engaged by the collar lip 80.

In assembling the valve seat 72 and the coupling collar 71, they are merely brought into axial registry, with the lower cam defining face of the valve seat ridge 86 engaging the upper cam defining face of the collar lip 80 and the valve seat is pressed downwardly to urge the ridge 86 inwardly to clear the lip 80, the ridge springing outwardly to engage the corresponding collar groove thereby to interlock the valve seat 72 and coupling collar 71. In the interlocked position the valve seat 72 is freely rotatable in the coupling collar even when under axial pressure.

The uses and operation of the last described embodiment are similar to those earlier described.

While there have been described and illustrated preferred embodiments of the present invention, it is apparent that numerous alterations, omissions and additions may be made without departing from the spirit thereof.

Having now described the invention what I claim and desire to secure by Letters Patent is:

1. A valve comprising a body member including an internally threaded bore, an externally threaded collar member engaging said internally threaded bore and having an end shoulder bordered by an axially extending peripheral flange having a peripheral groove formed in the inner face thereof, an annular plastic valve seat engaged by and substantially axially fixed and substantially freely rotatable relative to said collar and having a peripheral lip registering with said groove and a face abutting said shoulder, an axially movable valve stem supported by said body member, and a valve washer carried by said valve stem and movable therewith into and out of engagement with said valve seat.

2. A valve comprising a body member including an internally threaded bore, an externally threaded collar member engaging said internally threaded bore and having an end shoulder bordered by an axially extending peripheral flange provided with an inwardly directed peripheral lip axially spaced from said shoulder and delineating therewith a peripheral groove, an annular plastic valve seat engaged by and substantially axially fixed and substantially fully rotatable relative to said collar and having a peripheral lip registering with said groove and a face abutting said shoulder, an axially movable valve stem supported by said body member, and a valve washer carried by said valve stem and movable therewith into and out of engagement with said valve seat.

3. The valve of claim 2, wherein said valve seat has a curved end face.

4. The valve of claim 2, wherein said valve seat is an acetal resin.

5. The valve of claim 2, wherein said valve seat and collar are of an acetal resin.

6. The valve of claim 2, wherein said valve seat is polytetrafluoroethylene.

7. The valve of claim 2 wherein said valve seat lip is provided with a cam surface defining inclined peripheral face confronting said shoulder.

8. A valve seat assembly comprising an externally threaded collar member having a peripheral end shoulder and a surrounding axially projecting flange provided with an inwardly directed peripheral lip delineating a peripheral groove with said shoulder and an annular plastic valve seat rotatably coupled to said collar and substantially restricted against axial movement relative thereto and having an outer peripheral flange registering with said groove and one end face abutting said shoulder and another end face disposed above said collar flange.

9. The valve seat assembly of claim 8, wherein said valve seat other end face is of curved convex contour.

10. The valve seat assembly of claim 8, wherein said collar had an internal bore of non-circular transverse cross section to accommodate a tool.

11. The valve seat assembly of claim 8, wherein the outer peripheral edge of said valve seat other face is inclined to define a cam surface.

12. The valve seat assembly of claim 8, wherein said collar member flange is provided with a second peripheral shoulder disposed above said other shoulder and said valve seat is provided with a peripheral face abutting said second shoulder.

13. The valve seat assembly of claim 8, wherein said valve seat is formed of an acetal resin.

14. The valve seat assembly of claim 8, wherein said valve seat and collar are formed of an acetal resin.

15. The valve seat assembly of claim 8, wherein said valve seat is formed of polytetrafluoroethylene.

16. In a faucet having a fluid passageway, a valve seat having an opening, means on one end of said seat to releasably secure the same to said faucet at said passageway with the opening thereof in communication with said passageway and defining a part of said passageway, said seat having a retaining surface sloping downward and inward thereinto at the other end thereof, a radially directed circularly shaped groove including said retaining surface, a valve connected with said seat and having a circularly shaped radially directed protrusion coinciding with and positioned in said groove of said seat, said valve having a surface sloping downward and inward and cooperable with said retaining surface to retain said valve connected with said seat, said seat having a radially directed shoulder in and between the ends of said fluid passageway opening, the whole of said valve being positioned radially outward of said opening, and another portion of said valve extending beyond the other end of said seat.

17. In a faucet, a valve seat having a hole defined therein for the passage of fluid therethrough, a shoulder directed radially outward from said hole and spaced longitudinally inward from one end of said valve seat, a ring-shaped valve element having an interior wall larger than said hole and a surface engaging said shoulder with its interior wall spaced radially outward from the confines of said hole and an end extending beyond said one end of said valve seat, and a retaining surface on said valve seat engaging said valve element inward from said one end thereof to retain said surface of said valve element in engagement with said shoulder of said valve seat.

18. In a faucet as in claim 17, said retaining surface being sloped downward and inward from said one end of said valve seat to said valve seat shoulder, and said valve element having an outer surface coinciding with that of said retaining surface for cooperative engagement therewith.

19. In a faucet, a valve seat having a hole defined therein for the passage of fluid therethrough, a circular recess defined in said valve seat directed radially outward of and coextensive with said hole and longitudinally spaced inward from one end of said valve seat, a ring-shaped valve element in said circular recess, the opening in said ring-shaped valve element being of a size greater than that of said hole and said valve element extending beyond said one end of said valve seat, and a retaining surface defining a wall of said circular recess in said valve seat of less diameter thn the greatest diameter of said ring-shaped valve element to retain the same in said recess.

References Cited

UNITED STATES PATENTS

| | | | |
|---|---|---|---|
| 606,867 | 7/1898 | Hoover | 251—360 X |
| 2,865,596 | 12/1958 | Monnig | 251—175 |
| 2,196,977 | 4/1940 | Campbell et al. | 251—361 X |
| 2,920,861 | 1/1960 | Hartmann | 251—360 X |

FOREIGN PATENTS

| | | |
|---|---|---|
| 375,857 | 5/1907 | France. |
| 491,557 | 3/1953 | Canada. |

M. CARY NELSON, *Primary Examiner.*

S. SCOTT, *Assistant Examiner.*